United States Patent
Takami

(10) Patent No.: US 10,999,485 B2
(45) Date of Patent: May 4, 2021

(54) CONTROL APPARATUS, IMAGING APPARATUS, CONTROL METHOD, AND STORAGE MEDIUM FOR PERFORMING A TILT CONTROL

(71) Applicant: CANON KABUSHIKI KAISHA, Tokyo (JP)

(72) Inventor: Etsuya Takami, Yamato (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/658,295

(22) Filed: Oct. 21, 2019

(65) Prior Publication Data
US 2020/0128162 A1    Apr. 23, 2020

(30) Foreign Application Priority Data

Oct. 22, 2018 (JP) .............................. JP2018-198145

(51) Int. Cl.
*H04N 5/225* (2006.01)
*H04N 5/232* (2006.01)

(52) U.S. Cl.
CPC ....... *H04N 5/2259* (2013.01); *H04N 5/23212* (2013.01)

(58) Field of Classification Search
None
See application file for complete search history.

(56) References Cited

U.S. PATENT DOCUMENTS

| 2002/0080242 A1* | 6/2002 | Takahashi | H04N 5/23209 348/207.99 |
| 2012/0019676 A1* | 1/2012 | Foote | G02B 7/38 348/208.2 |
| 2016/0094841 A1* | 3/2016 | Wang | H04N 17/002 348/44 |
| 2017/0272658 A1* | 9/2017 | Ito | G03B 13/02 |

FOREIGN PATENT DOCUMENTS

| CN | 103246131 B | 6/2016 |
| JP | 2000013665 A | 1/2000 |
| JP | 2011059283 A | * 3/2011 |
| JP | 2011059283 A | 3/2011 |
| JP | 2017173802 A | 9/2017 |

OTHER PUBLICATIONS

Extended European Search Report dated Mar. 17, 2020 in corresponding EP Patent Application No. 19204012.9.

* cited by examiner

*Primary Examiner* — Edemio Navas, Jr.
(74) *Attorney, Agent, or Firm* — Carter, DeLuca & Farrell LLP

(57) ABSTRACT

A control apparatus includes a focus control unit configured to perform a focus control based on an image signal, a tilt control unit configured to control a tilt of an imaging plane based on the image signal, and a determination unit configured to determine a first evaluation area of the image signal used for the focus control and a second evaluation area of the image signal used for the tilt control in performing both the focus control and the tilt control. At least one processor or circuit is configured to perform a function of at least one of the units.

11 Claims, 7 Drawing Sheets

CONTROL APPARATUS, IMAGING APPARATUS, CONTROL METHOD, AND STORAGE MEDIUM FOR PERFORMING A TILT CONTROL

BACKGROUND OF THE INVENTION

Field of the Invention

The present invention relates to an imaging apparatus that can tilt an image sensor relative to a plane orthogonal to an optical axis direction of an imaging optical system.

Description of the Related Art

A network camera may not acquire a long depth of field in scenes, such as a long house, a hallway, and a parking lot, depending on an imaging condition, such as a lens performance, a field angle, and an aperture stop. For example, in a scene having a long depth where a road, a passerby, or a car is imaged from a network camera installed on a ceiling, only partial imaging area is focused.

One conventional method that adjusts a focal plane is to tilt an imaging plane (image sensor or tilt lens) relative to a plane orthogonal to an optical axis of an imaging optical system in order to obtain a long depth of field. Japanese Patent Application Laid-Open No. ("JP") 2017-173802 discloses a method of tilting an image sensor (imaging plane) relative to a plane orthogonal to an optical axis of an imaging optical system. JP 2000-13665 discloses a method of tilting an imaging plane relative to a plane orthogonal to an optical axis of an imaging optical system using a bellows unit.

However, when the tilt of the imaging plane is changed relative to the plane orthogonal to the optical axis of the imaging optical system (the tilt control of the imaging plane is performed), an evaluation value used for an autofocus ("AF") control obtained from a captured image changes. Hence, the tilt control of the imaging plane and focus control cannot be performed at the same time, and it takes a long time to complete both controls.

The method disclosed in JP 2017-173802 needs a focus control after a focal plane is adjusted by performing a tilt control of the image sensor. The method disclosed in JP 2000-13665 needs a focus control after the focal plane is adjusted by controlling the bellows unit. Thus, it takes a long time for both methods of JPs 2017-173802 and 2000-13665 to complete a focus control after the focal plane adjustment (tilt control of the imaging plane) starts.

SUMMARY OF THE INVENTION

The present invention provides a control apparatus, an imaging apparatus, a control method, and a storage medium (or a program), each of which can quickly perform a focus control and a tilt control of an imaging plane.

A control apparatus according to one aspect of the present invention includes a focus control unit configured to perform a focus control based on an image signal, a tilt control unit configured to control a tilt of an imaging plane based on the image signal, and a determination unit configured to determine a first evaluation area of the image signal used for the focus control and a second evaluation area of the image signal used for the tilt control in performing both the focus control and the tilt control. At least one processor or circuit is configured to perform a function of at least one of the units.

An imaging apparatus according to another aspect of the present invention includes an image sensor configured to photoelectrically convert an optical image formed through an imaging optical system and outputs an image signal, and the above control apparatus.

A control method according to another aspect of the present invention includes the steps of determining a first evaluation area of an image signal used for a focus control and a second evaluation area of the image signal used for a tilt control, and performing both the focus control based on the first evaluation area of the image signal, and the tilt control based on the second evaluation area of the image signal.

A non-transitory computer-readable storage medium storing a program for causing a computer to execute the above control method constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

The imaging apparatus according to this embodiment can be mounted on a variety of devices that having a function of capturing a motion image. Illustrative devices having a function of capturing a motion image include an imaging apparatus such as a network camera, a video camera, and a still camera, a mobile phone having an imaging function, a portable information terminal, and the like. This embodiment describes a tilt control of the image sensor as a control for tilting the imaging plane within the plane orthogonal to the optical axis of the imaging optical system (tilt control of the imaging plane), but the present invention is not limited to this embodiment. The present invention is also applicable to a configuration in which the tilt of the imaging plane is controlled using a tilt lens of the imaging optical system, for example. In the following description, the present invention is installed in the imaging apparatus such as the network camera as an example.

Overall Structure

Figure 1:
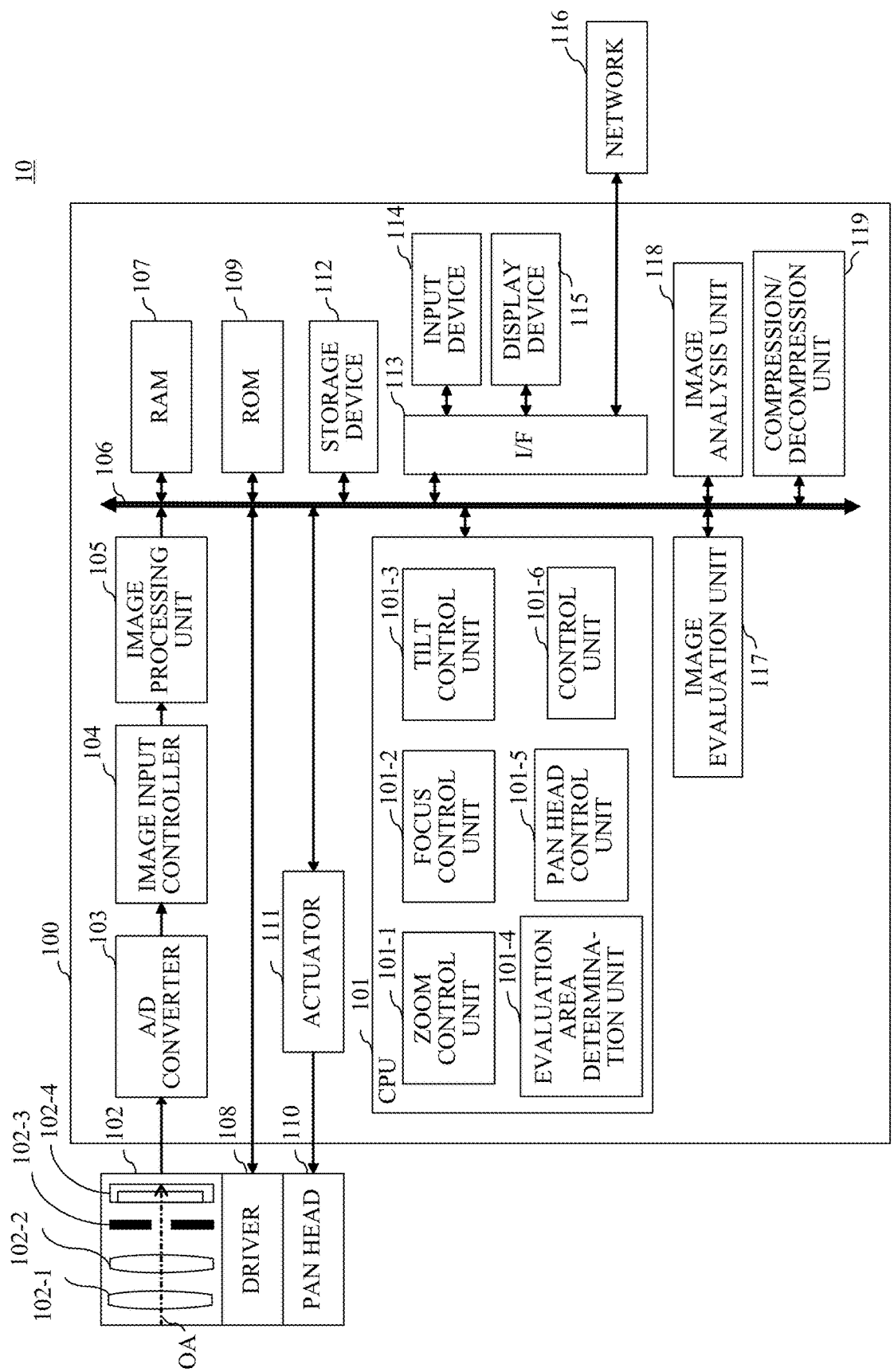
FIG. 1 is a block diagram of an imaging apparatus according to each embodiment.
Figure 2A:
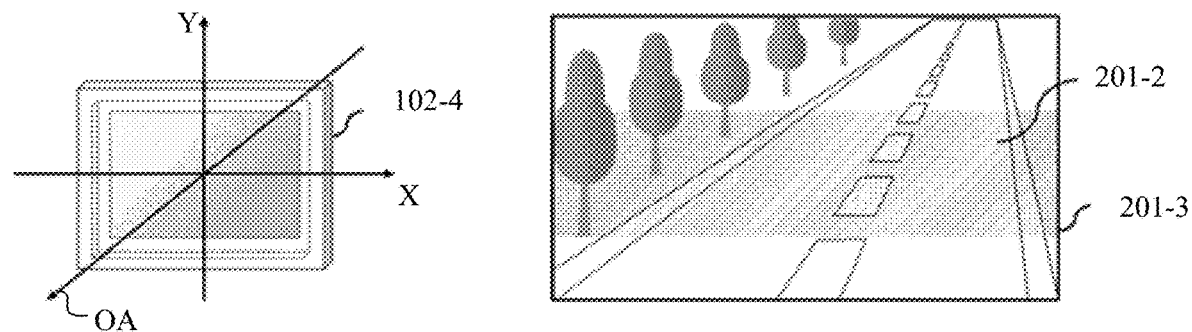
FIGS. 2A to 2C illustrate a relationship between a tilted image sensor and a focus plane of an image according to each embodiment.
Figure 2B:
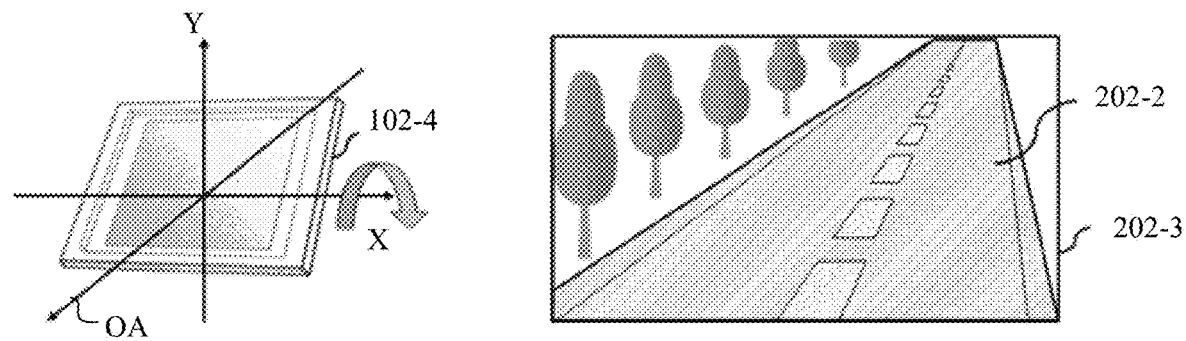
Figure 2C:
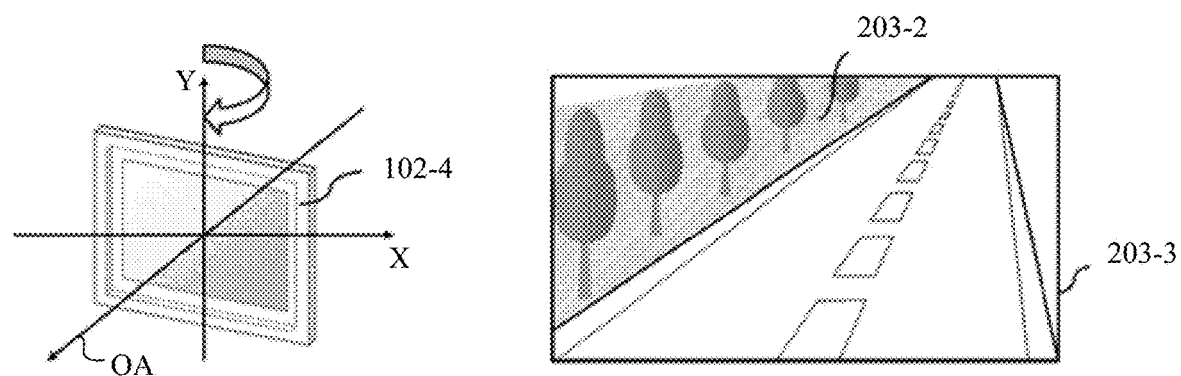

Referring now to FIGS. 1 and 2A-2C, a description will be given of an overall configuration of an imaging apparatus according to this embodiment. FIG. 1 is a block diagram of an imaging apparatus 10. FIGS. 2A to 2C illustrate a relationship between the tilt of the image sensor and the focal plane of the image.

The imaging apparatus 10 includes a main body 100, an image capturer 102, a driver 108, and a pan head (camera platform) 110. A CPU (control apparatus) 101 is a central processing unit provided in the main body 100. The CPU 101 includes a zoom control unit 101-1, a focus control unit 101-2, a tilt control unit 101-3, an evaluation area determination unit (determination unit) 101-4, a pan head control unit 101-5, and a control unit 101-6.

The image capturer 102 includes a zoom lens 102-1, a focus lens 102-2, an aperture stop (diaphragm) 102-3, and an image sensor 102-4. The zoom lens 102-1, the focus lens 102-2, and the aperture stop 102-3 constitute an imaging optical system. The image sensor 102-4 includes a CMOS image sensor, a CCD image sensor, or the like, and photoelectrically converts an optical image (object image) formed through the imaging optical system and outputs an image signal. The driver 108 moves the zoom lens 102-1 along the direction of the optical axis OA (optical axis direction) in accordance with a control instruction of the zoom control unit 101-1. The driver 108 moves the focus lens 102-2 along the optical axis direction in accordance with a control instruction from the focus control unit 101-2. The driver 108 changes an aperture amount of the aperture stop 102-3 in accordance with a control instruction from the control unit 101-6.

The driver 108 tilts the image sensor 102-4 (imaging plane) relative to the plane orthogonal to the optical axis OA of the imaging optical system in accordance with a control instruction of the tilt control unit 101-3. As illustrated in FIG. 2A, when the image sensor 102-4 is not tilted relative to the optical axis OA in the image pickup, an image 201-3 having a focal plane 201-2 is obtained. On the other hand, as illustrated in FIG. 2B, when the image sensor 102-4 is tilted in the tilt direction (rotated around the X axis) in the image pickup, an image 202-3 having a focal plane 202-2 is obtained. As illustrated in FIG. 2C, when the image sensor 102-4 is tilted in the pan direction (rotated around the Y axis) in the image pickup, an image 203-3 having a focal plane 203-2 is obtained. In this way, the focal plane of the captured image can be controlled by tilting the image sensor 102-4.

This embodiment is not limited to this example, and the focal plane of the captured image can be controlled using a tilt lens instead of the image sensor 102-4. At this time, the CPU 101 has a tilt lens control unit (not illustrated) having the same function as the tilt control unit 101-3. Then, the driver 108 drives a tilt lens (not shown) in the imaging optical system in accordance with a control instruction from the tilt lens control unit, and tilts the imaging plane relative to the plane orthogonal to the optical axis OA of the imaging optical system, thereby controlling the focal plane similar to the method of tilting the image sensor 102-4.

The pan head 110 has a pan driver and a tilt driver. The pan driver of the pan head 110 includes a bottom case and a turntable, and pans the image capturer 102 by rotating the turntable in the horizontal direction. The pan driver of the pan head 110 according to this embodiment is rotatable from −175° to +175° in the lateral direction. The tilt driver of the pan head 110 includes a support and an image capturer provided on the turntable, and rotates the image capturer 102 in the vertical direction. The tilt driver can rotate from 0° in the horizontal direction to 90° in the upward direction. As described above, the image capturer 102 can perform imaging while changing the imaging direction by rotating the image capturer 102 in the horizontal direction and the vertical direction via the actuator 111 in accordance with a control instruction from the control unit 101-6.

The image sensor 102-4 photoelectrically converts light that has passed the imaging optical system (the zoom lens 102-1, the focus lens 102-2, and the aperture stop 102-3) and generates an analog image signal. The image sensor 102-4 performs amplification processing by sampling processing such as correlated double sampling for the generated analog image signal, and outputs the result to an A/D converter 103. The parameter used for the amplification processing is controlled by the CPU 101. The A/D converter 103 converts the amplified analog image signal into a digital image signal, and outputs the digital image signal obtained by the conversion to an image input controller 104. The image input controller 104 takes in the digital image signal output from the A/D converter 103 and outputs it to the image processing unit 105.

The image processing unit 105 performs various digital image processing for the digital image signal output from the image input controller 104 based on sensitivity information, AGC (auto gain control) gain, or ISO (International Organization for Standardization) speed etc. output from the image sensor 102-4. The image processing unit 105 stores the processed image signal, via a bus 106, in the RAM 107 connected to the bus 106. Various digital image processing includes, for example, offset processing, gamma correction processing, gain processing, RGB interpolation processing, noise reduction processing, contour correction processing, color tone correction processing, or light source type determination processing. The RAM 107 is a volatile memory such as SRAM or DRAM. The ROM 109 is a nonvolatile memory such as an EEPROM or a flash memory.

A storage device 112 is a memory such as an HDD (Hard Disk Drive), SSD (Solid State Drive), or eMMC (embedded multimedia card). A program for realizing the functions according to this embodiment and data used when the program is executed are stored in the ROM 109 or the storage device 112. These programs and data are appropriately fetched into the RAM 107 via the bus 106 based on the control of the CPU 101 and executed by each component in the CPU 101.

An I/F 113 includes a variety of I/Fs (interfaces) relating to inputs and outputs. The I/F 113 is connected to an input device 114, such as an operation key including a relay switch and a power switch, a cross key, a joystick, a touch panel, a keyboard, and a pointing device (such as a mouse). The I/F 113 receives instruction information from the input device 114 and notifies the CPU 101 of the instruction information via the bus 106. The I/F 113 is connected to a display device 115 such as an LCD display. The display device 115 displays an image and operation menu information temporarily recorded in the RAM 107. The I/F 113 is connected to the network 116 via a LAN.

An image evaluation unit 117 calculates an evaluation value in a designated area (evaluation area) of an image via the bus 106 in accordance with a control instruction from the evaluation area determination unit 101-4. The image evaluation unit 117 acquires an image (captured image) from the RAM 107 via the bus 106, and calculates an evaluation value (contrast evaluation value) relating to the contrast at the specific frequency based on a luminance value of the designated area. An image analysis unit 118 performs an image analysis such as a face detection, a person detection, a moving object detection, a passage detection, a crowd detection, a trajectory detection, and leaving/taking away detection. The image analysis result by the image analysis unit 118 is notified to the CPU 101 via the bus 106.

A compression/decompression unit 119 performs compression processing for the image in accordance with a control instruction from the CPU 101 via the bus 106 and generates compressed data. The compressed data is output to the display device 115 and the network 116 via the I/F 113. The compression/decompression unit 119 performs decompression processing in a predetermined format for the compressed data stored in the storage device 112 and generates uncompressed data. As compression/decompression processing in the predetermined format, processing conforming to the JPEG standard is performed for a still image, and processing conforming to a standard, such as MOTION-JPEG, MPEG2, AVC/H.264, and AVC/H. 265, is performed for a motion image.

First Embodiment

Referring now to FIGS. 3 to 5A to 5D, a description will be given of a control method (focus control and tilt control of the image sensor 102-4 by the imaging apparatus 10) according to a first embodiment. In this embodiment, the evaluation area determination unit 101-4 allocates (determines) an evaluation area (first evaluation area) used for the focus control and an evaluation area (second evaluation area) used for the tilt control of the image sensor 102-4.

Figure 3:
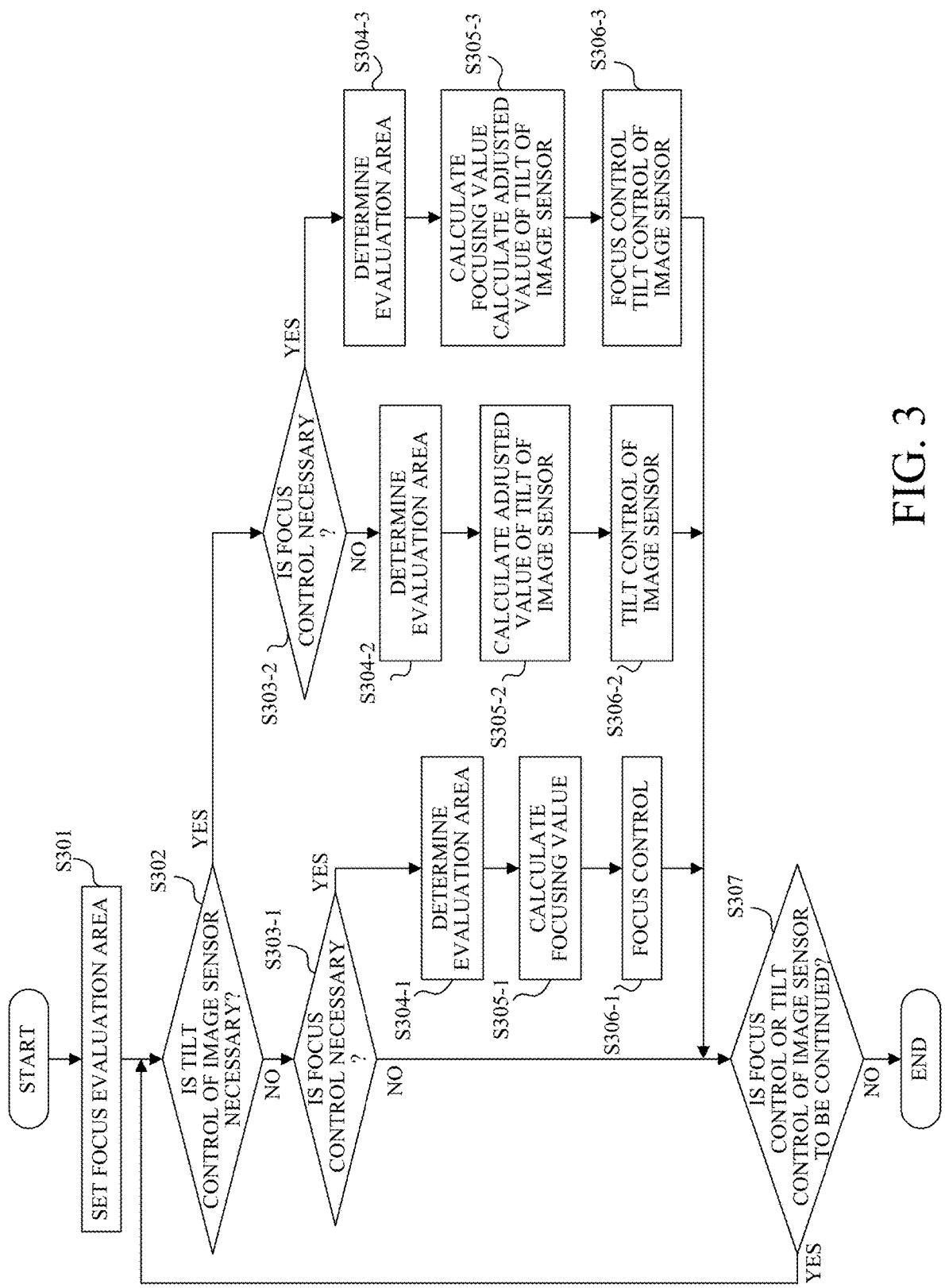
FIG. 3 is a flowchart of a control method according to a first embodiment.
Figure 4A:
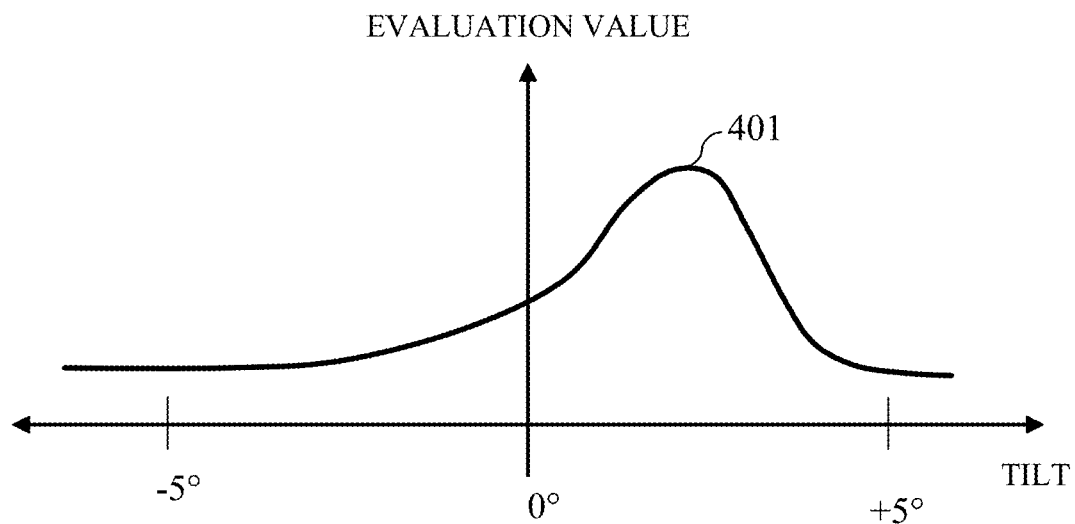
FIGS. 4A and 4B explain an evaluation value used for a tilt control of the image sensor according to each embodiment.
Figure 4B:
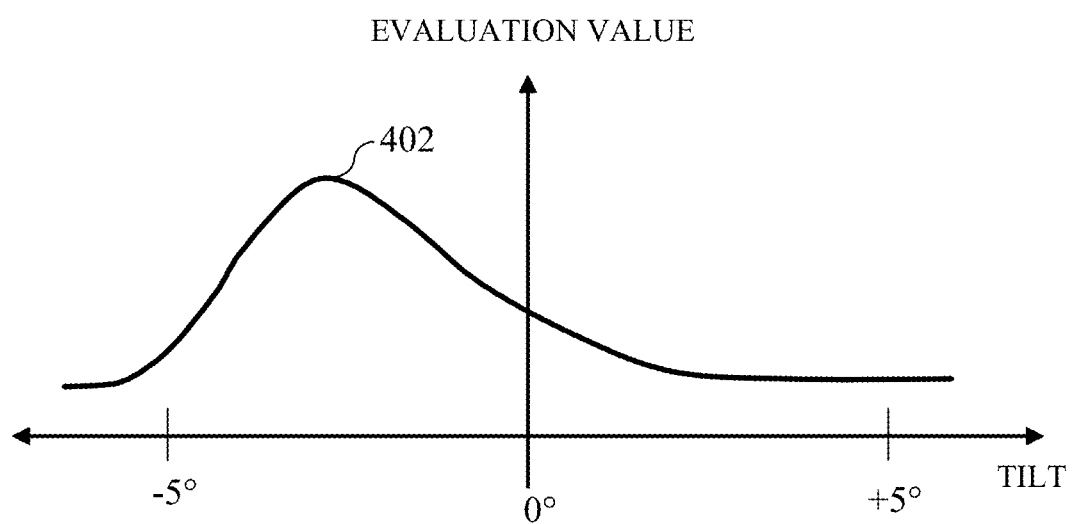

FIG. 3 is a flowchart of the control method according to this embodiment. Each step in FIG. 3 is mainly executed by each unit of the CPU 101. FIGS. 4A and 4B explain the evaluation value used for the tilt control of the image sensor 102-4. In FIGS. 4A and 4B, the abscissa axis represents the tilt (degree) of the image sensor 102-4, and the ordinate axis represents the evaluation value. FIGS. 5A to 5D explain the evaluation area (first evaluation area) used for the focus control and the evaluation area (second evaluation area) used for the tilt adjustment of the image sensor.

First, in the step S301, an autofocus area (first evaluation area used for the focus control) is designated to the evaluation area determination unit 101-4 through the input device 114 or the network 116, the I/F 113, and the bus 106 by a user operation. The designation of the autofocus area by the user includes one-point AF, zone AF, auto selection AF, and the like. The evaluation area determination unit 101-4 sets an autofocus area designated by the user and stores information on the autofocus area in the RAM 107 via the bus 106. The designation of the autofocus area by the user is a general function of the imaging apparatus, and thus a description thereof will be omitted. However, this embodiment does not limit the method for designating the autofocus area.

Next, in the step S302, the tilt control unit 101-3 determines whether the tilt adjustment (tilt control) of the image sensor 102-4 is necessary. For example, when the evaluation value (contrast evaluation value) regarding the contrast at the specific frequency acquired from the image evaluation unit 117 is smaller than a predetermined threshold, the tilt control unit 101-3 determines that it is necessary to adjust the tilt of the image sensor 102-4. Alternatively, the tilt control unit 101-3 determines that the tilt of the image sensor 102-4 needs to be adjusted when the image sensor 102 is pan or tilted by the pan head control unit 101-5 and the angle of view is changed. Alternatively, when the one-shot tilt adjustment is instructed by the user via the input device 114 or the network 116, the I/F 113, and the bus 106, the tilt control unit 101-3 determines that it is necessary to adjust the tilt of the image sensor 102-4. If it is determined that the tilt adjustment of the image sensor 102-4 is unnecessary, the flow proceeds to the step S303-1. On the other hand, if it is determined that the tilt of the image sensor 102-4 needs to be adjusted, the flow proceeds to the step S303-2.

In the step S303-1, the focus control unit 101-1 determines whether focusing (focus control) is necessary. For example, when the evaluation value regarding the contrast at the specific frequency acquired from the image evaluation unit 117 is smaller than a predetermined threshold, the focus control unit 101-1 determines that focusing is necessary. The focus control unit 101-1 determines that the focusing is necessary when the zoom control unit 101-1 controls the zoom lens 102-1 via the bus 106 and the driver 108. When the one-shot focusing is instructed by the user operation through the input device 114 or the network 116, the I/F 113, and the bus 106, the focus control unit 101-1 determines that the focusing is necessary. If it is determined that focusing is unnecessary, the flow proceeds to the step S307. On the other hand, if it is determined that the focusing is necessary, the flow proceeds to the step S304-1. If it is determined that the focusing is unnecessary in the step S303-2, the flow proceeds to the step S304-2. On the other hand, if it is determined that the focusing is necessary in the step S303-2, the flow proceeds to the step S304-3.

In the step S304-1, the evaluation area determination unit 101-4 determines the evaluation area (first evaluation area) used to calculate the focusing value (focus control) in the image (captured image). The evaluation area used to calculate the focusing value is determined based on the designation information of the autofocus area designated and stored in the step S301.

Next, in the step S305-1, the focus control unit 101-2 acquires the evaluation value relating to the contrast at a specific frequency calculated by the image evaluation unit 117 based on the evaluation area determined by the evaluation area determination unit 101-4 in the step S304-1. Since a general contrast evaluating method can be used as the evaluation value evaluating method, a description thereof will be omitted. Based on the evaluation value acquired from the image evaluation unit 117, the focus control unit 101-2 calculates a focusing value for driving the focus lens 102-1 so as to obtain a higher contrast. However, this embodiment does not limit the calculation method of the focusing value. Next, in the step S306-1, the focus control unit 101-2 controls (focusing of) the focus lens 102-2 via the bus 106 and the driver 108 based on the focusing value calculated in the step S305-1. Then, the flow proceeds to the step S307.

Figure 5A:
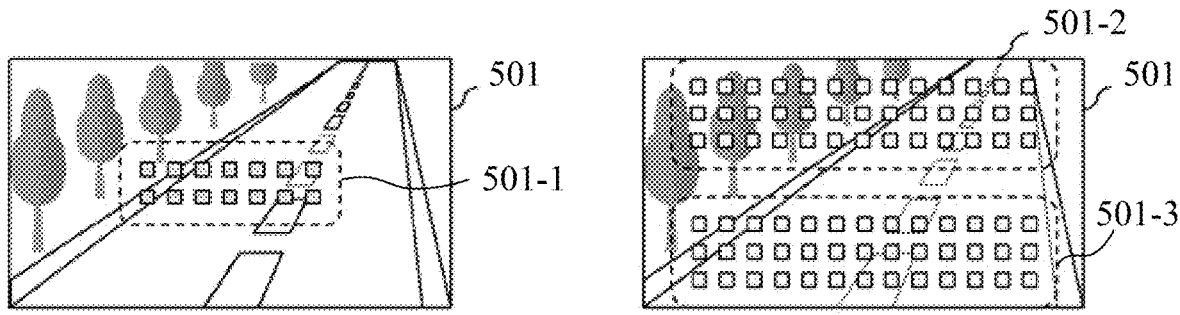
FIGS. 5A to 5D are explanatory diagrams of an evaluation area used for a focus control and an evaluation area used for the tilt control of the image sensor according to each embodiment.
Figure 5B:
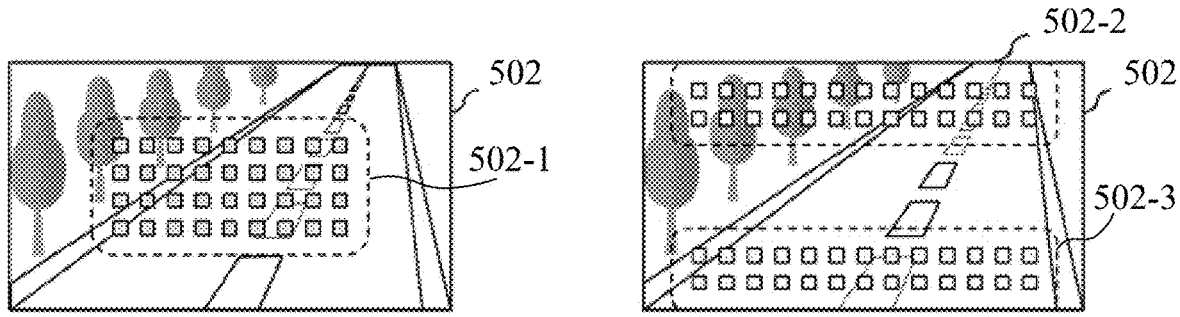
Figure 5C:
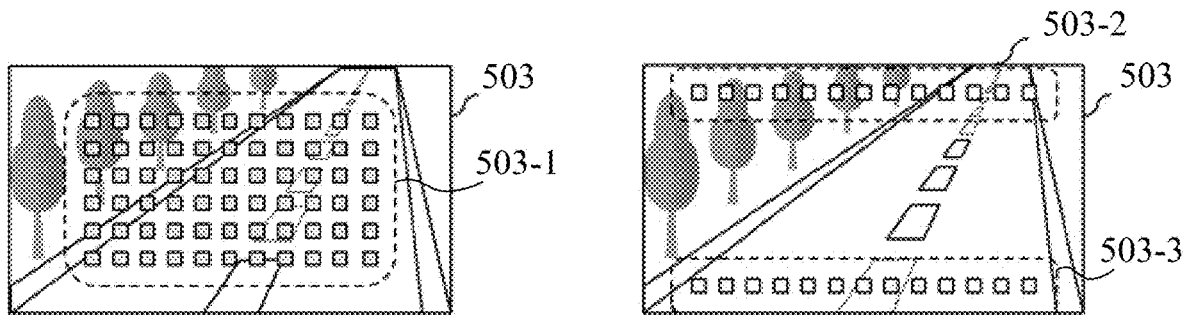
Figure 5D:
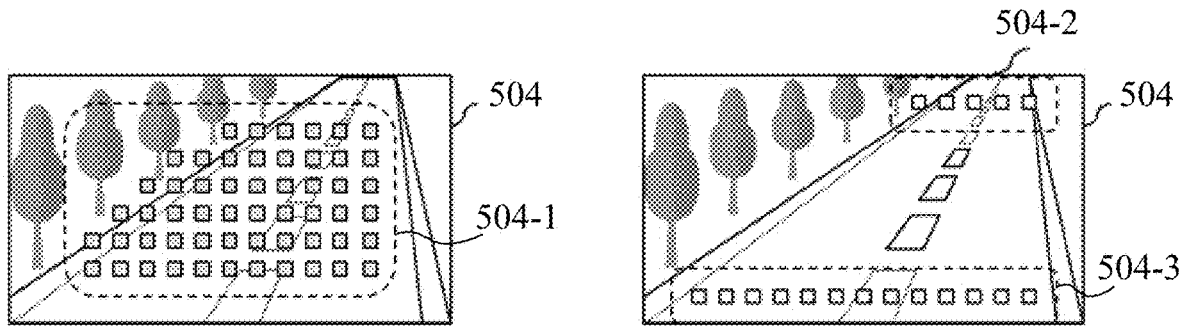

In the step S304-2, the evaluation area determination unit 101-4 determines an evaluation area (second evaluation area) used to calculate the tilt adjustment value of the image sensor 102-4 (or for the tilt control). The evaluation area used for the tilt control of the image sensor 102-4 is at least part of the peripheral area of the image (captured image). When the image sensor 102-4 is vertically tilted, one or both of the upper part and the lower part of the image (captured image) are used for the second evaluation area. On the other hand, when the image sensor 102-4 is laterally tilted, one or both of the left part and the right part of the image (captured image) are used for the second evaluation area. FIG. 5A illustrates an illustrative evaluation area 501-2 at the upper part of the image (captured image) 501 and an evaluation area 501-3 at the lower part of the image 501 as evaluation areas used to calculate the tilt adjustment value of the image sensor 102-4.

Next, in the step S305-2 in FIG. 3, the tilt control unit 101-3 obtains an evaluation value relating to the contrast at a specific frequency calculated by the image evaluation unit 117, based on the evaluation area determined by the evaluation area determination unit 101-4 in the step S304-2. The evaluation method used for the tilt adjustment of the image sensor 102-4 is the same as the evaluation method used for the focusing, and thus a description thereof will be omitted.

An evaluation value 401 in FIG. 4A indicates an evaluation value relating to the contrast at a specific frequency at upper part of an image (captured image) obtained in a certain scene. An evaluation value 402 in FIG. 4B indicates an evaluation value relating to the contrast at a specific frequency at lower part of the image obtained in the same scene. In this case, a higher evaluation value can be obtained from the evaluation value of the upper part of the image by tilting the image sensor 102-4 in a direction away from the plane orthogonal to the optical axis OA of the imaging optical system (+direction). On the other hand, from the evaluation value of the lower part of the image, a higher evaluation value can be obtained by tilting the image sensor 102-4 in a direction approaching to the plane orthogonal to the optical axis OA of the imaging optical system (−direction). In other words, by tilting the image sensor 102-4 so that the upper part of the image sensor 102-4 moves in the +direction and its lower part moves in the −direction, the focused area (in-focus area) can be expanded. Thus, the tilt control unit 101-3 calculates an adjustment value (tilt adjustment value) for tilting the image sensor 102-4 so as to obtain a higher contrast based on the evaluation value acquired from the image evaluation unit 117. However, this embodiment does not limit the method of calculating the tilt adjustment value of the image sensor 102-4.

Next, in the step S306-2 in FIG. 3, the tilt control unit 101-3 performs the tilt control of the image sensor 102-4 through the bus 106 and the driver 108 based on the tilt adjustment value of the image sensor 102-4 calculated in the step S305-2. Then, the flow proceeds to step S307.

In the step S304-3, the evaluation area determination unit 101-4 determines the evaluation area used to calculate the focusing value (or for the focus control) in the image (captured image) and the evaluation area used to calculate the tilt adjustment value of the image sensor 102-4 (or for the tilt control). The evaluation area (first evaluation area) used to calculate the focusing value may use the central area of the image (captured image). On the other hand, the evaluation area (second evaluation area) used to calculate the tilt adjustment value of the image sensor 102-4 may use at least part of the peripheral area of the image. In other words, when the image sensor 102-4 is vertically tilted, the upper and lower parts of the image are used as the second evaluation area, and when the image sensor 102-4 is laterally tilted, the left and right parts of the image are used as the second evaluation area.

The evaluation area used to calculate the focusing value and the evaluation area used to adjust the tilt of the image sensor 102-4 are variable. In a predetermined case, the evaluation area determination unit 101-4 invalidates the designation of the autofocus area specified and stored in the step S301. The predetermined case is, for example, at the start of focusing where the target focal length is least likely to be focused, or at the start of tilting of the image sensor 102-4 where the tilt of the image sensor 102-4 most significantly shifts from the target focal plane. Then, as illustrated in FIG. 5A, the evaluation area determination unit 101-4 disposes the evaluation area 501-1 used to calculate the focusing value at the center (central area) of the image 501. On the other hand, the evaluation area determination unit 101-4 disposes the evaluation areas 501-2 and 501-3 used to calculate the tilt adjustment value of the image sensor 102-4 at the upper part and the lower part (peripheral area) of the image 501, respectively. The evaluation areas 501-2 and 501-3 used to calculate the tilt adjustment value of the image sensor 102-4 may be arranged on the left and right parts of the image 501, respectively.

Then, as the focusing proceeds and the in-focus area expands, the evaluation area determination unit 101-4 expands the evaluation area 501-1 of the image 501 in FIG. 5A. At this time, the evaluation area determination unit 101-4 expands the evaluation area 501-1 into, for example, evaluation areas 502-1, 503-1, and 504-1 of the images 502, 503, and 504 in FIGS. 5B, 5C, and 5D. When the focused area is wider than the predetermined area, the evaluation area determination unit 101-4 may determine the evaluation area used to calculate the focusing value based on the designation information of the autofocus area designated and stored in the step S301.

As the tilt adjustment of the image sensor 102-4 proceeds and the adjustment amount of the tilt of the image sensor 102-4 reduces, the evaluation area determination unit 101-4 may change the evaluation areas 501-2 and 501-3 in the image 501 in FIG. 5A. For example, the evaluation area determination unit 101-4 may change them like the evaluation areas 502-2, 502-3, 503-2, 503-3, 504-2, and 504-3 in the images 502, 503, and 504 in FIGS. 5B, 5C, and 5D. However, FIGS. 5A to 5D are merely illustrative assignment of the evaluation areas in the image, and this embodiment does not limit the assignment of evaluation areas. Then, the focus control unit 101-2 and the tilt control unit 101-3 acquire the evaluation value relating to the contrast at a specific frequency calculated by the image evaluation unit 117 based on the respective evaluation areas determined by the evaluation area determination unit 101-4 in the step S304-2.

Next, in the step S305-3 in FIG. 3, the focus control unit 101-2 acquires an evaluation value relating to the contrast at the specific frequency calculated by the image evaluation unit 117, based on the evaluation area determined by the evaluation area determination unit 101-4 in the step S304-3. The tilt control unit 101-3 acquires the evaluation value relating to the contrast at the specific frequency calculated by the image evaluation unit 117 based on the evaluation area determined by the evaluation area determination unit 101-4 in the step S304-3. Then, the focus control unit 101-2 calculates a focusing value for adjusting the driving of the focus lens 102-1 so as to obtain a higher contrast, based on the evaluation value acquired by the image evaluation unit 117. The tilt control unit 101-3 calculates a tilt adjustment value for adjusting the tilt of the image sensor 102-4 so as to obtain a higher contrast, based on the evaluation value acquired by the image evaluation unit 117. The calculation methods of the focusing value and the tilt adjustment value is the same as those in the steps S305-1 and S305-2, and thus a description thereof will be omitted. This embodiment does not limit the calculation method of the focusing value and the calculation method of the tilt adjustment value of the image sensor.

Next, in the step S306-3, the focus control unit 101-2 controls (focusing of) the focus lens 102-2 via the bus 106 and the driver 108 based on the focusing value calculated in the step S305-3. In addition, the tilt control unit 101-3 performs a tilt control of the image sensor 102-4 via the bus 106 and the driver 108 based on the tilt adjustment value of the image sensor 102-4 calculated in the step S306-2. Then, the flow proceeds to the step S307.

In the step S307, each of the focus control unit 101-2 and the tilt control unit 101-3 determines whether to continue the focus control or tilt control. When the autofocus or one-shot focus is instructed by the user operation, the focus control unit 101-2 determines that the focus control is to continue. When the automatic tilt control or one-shot tilt control of the image sensor 102-4 is instructed by the user operation, the tilt control unit 101-3 determines that the tilt control of the image sensor 102-4 is to continue. If it is determined that at least one of focus control and tilt control is to continue, the flow returns to the step S302. On the other hand, if it is determined that neither the focus control nor the tilt control is to continue, this flow ends.

This embodiment can efficiently execute the tilt control of the image sensor and the focus control by making variable the evaluation area used for the tilt control of the image sensor and the evaluation area used for the focus control. Thus, this embodiment can quickly provide the focal plane adjustment and focusing.

Second Embodiment

Figure 6:
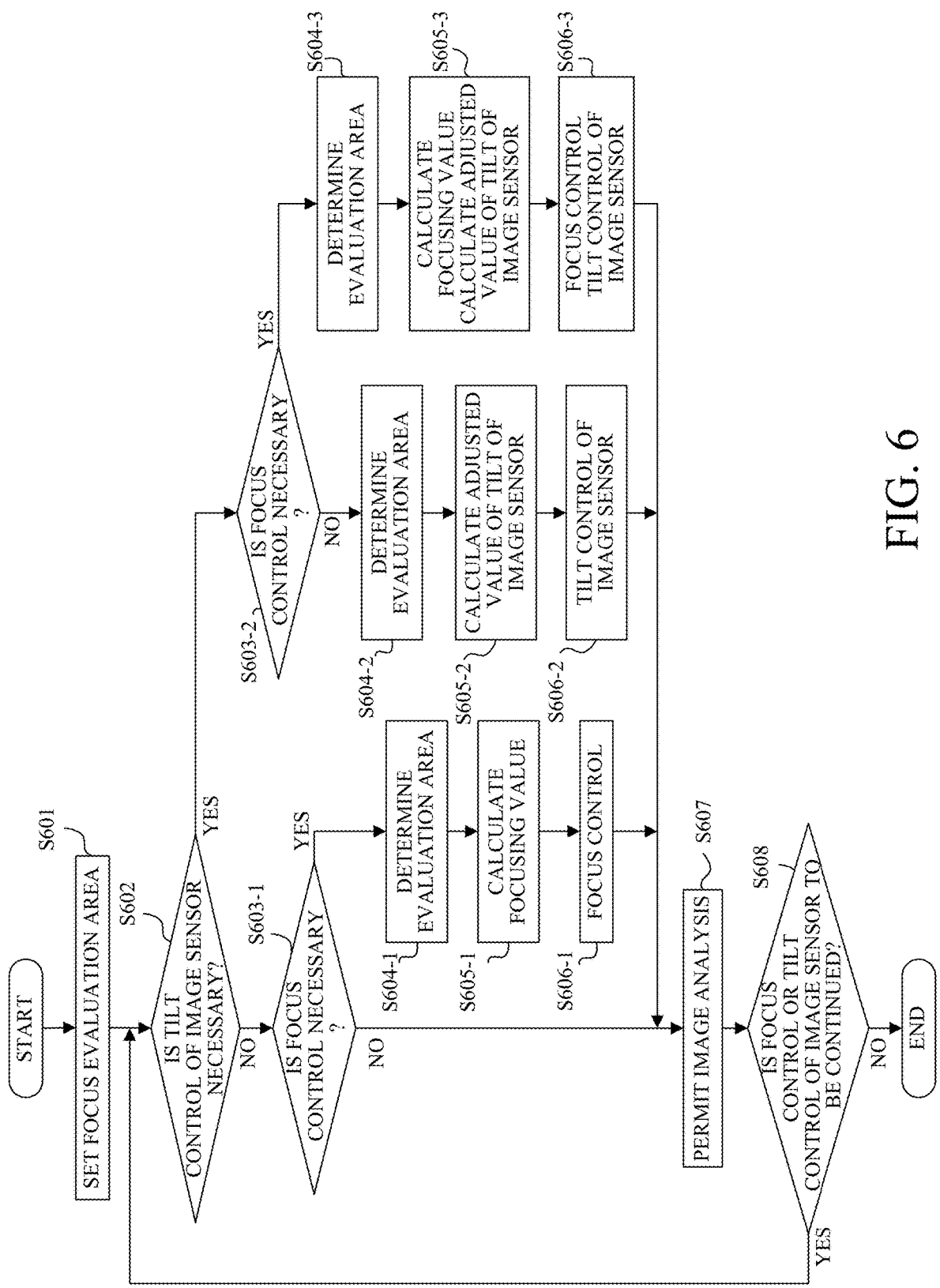
FIG. 6 is a flowchart of a control method according to a second embodiment.

Referring now to FIG. 6, a description will be given of a control method (focus control and tilt control of the image sensor 102-4 by the imaging apparatus 10) according to a second embodiment. In this embodiment, similar to the first embodiment, the evaluation area determination unit 101-4 allocates (determines) an evaluation area (first evaluation area) used for the focus control and an evaluation area (second evaluation area) used for the tilt control of the image sensor 102-4. In this embodiment, in order to suppress the influence on the image analysis by the focus control and the tilt control of the image sensor 102-4, the control unit 101-6 permits the image analysis only when a predetermined condition is satisfied.

FIG. 6 is a flowchart of a control method according to this embodiment. Each step in FIG. 6 is mainly executed by each unit of the CPU 101. The flowchart in FIG. 6 differs from that in FIG. 3 in that the step S607 is inserted. The steps S601 to S606 and S608 in FIG. 6 are the same as steps S301 to S307 in FIG. 3, and a description thereof will be omitted.

In the step S607, the control unit 101-6 determines whether the focus control unit 101-2 has obtained a predetermined focusing result and/or the tilt control unit 101-3 has obtained the predetermined tilt adjustment result (or whether a predetermined condition is satisfied). When the predetermined condition is satisfied, the control unit 101-6 permits the image analysis of the captured image by the image analysis unit 118. On the other hand, when the predetermined condition is not satisfied, the control unit 101-6 does not permit the image analysis of the captured image by the image analysis unit 118.

This embodiment permits an image analysis only when the tilt control result of the image sensor or the focus control result satisfies the predetermined condition. Therefore, this embodiment can quickly provide the focal plane adjustment and focusing while suppressing the influence on the image analysis.

Third Embodiment

Figure 7:
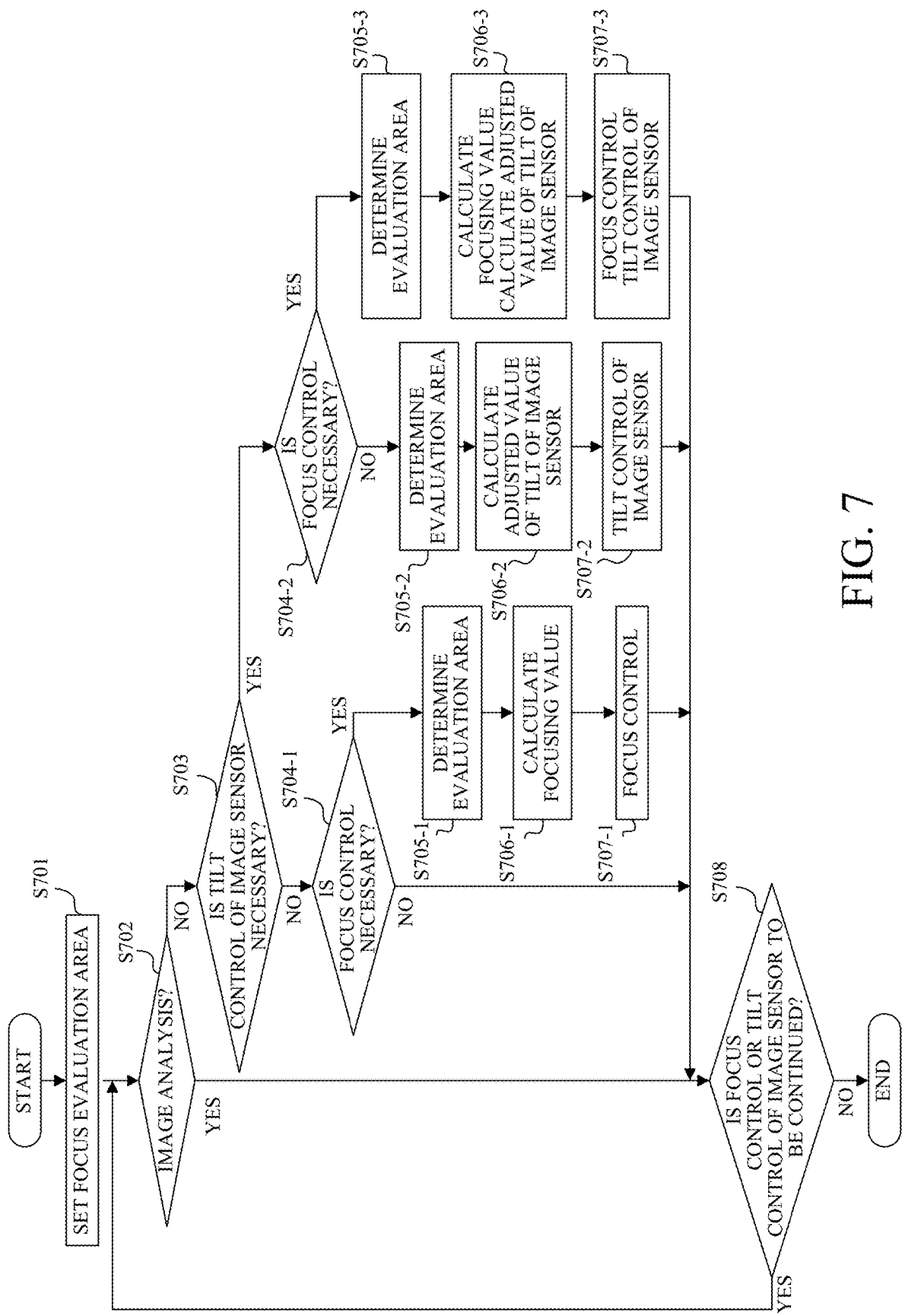
FIG. 7 is a flowchart of a control method according to a third embodiment.

Referring now to FIG. 7, a description will be given of a control method (focus control and tilt control of the image sensor 102-4 by the imaging apparatus 10) according to a third embodiment. In this embodiment, similar to the first embodiment, the evaluation area determination unit 101-4 allocates (determines) an evaluation area (first evaluation area) used for the focus control and an evaluation area (second evaluation area) used for tilt control of the image sensor 102-4. This embodiment performs the focus control and tilt control of the image sensor 102-4 during an imaging period in which the image analysis is not performed.

FIG. 7 is a flowchart of the control method according to this embodiment. Each step in FIG. 7 is mainly executed by each unit in the CPU 101. The flowchart in FIG. 7 differs from that in FIG. 3 in that the step S702 is inserted. The steps S701 and S703 to S708 in FIG. 7 are the same as steps S301 to S308 in FIG. 1, respectively, so a description thereof will be omitted.

In the step S702, the control unit 101-6 determines whether or not the image analysis unit 118 is performing the image analysis, or whether or not the next captured image is scheduled to be analyzed. If the image analysis unit 118 determines that the image analysis unit 118 is not performing the image analysis or does not plan to perform the image analysis of the next captured image, the control unit 101-6 proceeds to the step S703 to execute the same subsequent flow as that of the first embodiment. On the other hand, if the control unit 101-6 determines that the image analysis unit 118 is performing the image analysis or plans to perform the image analysis for the next captured image, the control unit 101-6 proceeds to the step S708. In other words, in this case, the control unit 101-6 controls the focus control unit 101-2 and the tilt control unit 101-3 so that at least one of the focus control and the tilt control for the image sensor is not performed.

This embodiment can perform the focus control and tilt control of the image sensor during an image capture period in which no image analysis is performed. This embodiment can quickly the focal plane adjustment and focusing while suppressing the influence on the image analysis.

As described above, in each embodiment, the control apparatus (CPU 101) includes the focus control unit 101-2, the tilt control unit 101-3, and the determination unit (evaluation area determination unit 101-4). The focus control unit performs the focus control based on the image signal (captured image). The tilt control unit performs the tilt control of the imaging plane based on the image signal (captured image). The determination unit determines the first evaluation area of the image signal used for the focus control and the second evaluation area of the image signal used for the tilt control in performing both the focus control and the tilt control.

In performing both the focus control and the tilt control, the first evaluation area and the second evaluation area may be made variable. In performing both the focus control and the tilt control, the first evaluation area and the second evaluation area may be different from each other. The focus control unit and the tilt control unit may simultaneously perform the focus control and tilt control.

The tilt control unit may control the tilt of the imaging plane by tilting the image sensor 102-4 relative to the plane orthogonal to the optical axis OA of the imaging optical system. In performing both the focus control and tilt control, the determination unit may determine the first evaluation area by invalidating an arbitrary evaluation area used for the focus control that has been determined in advance. In performing both the focus control and tilt control, the determination unit may determine the central area of the image signal as the first evaluation area, and at least part of the peripheral area of the image signal as the second evaluation area. The second evaluation area may be upper part and lower part of the image signal, or left part and right part of the image signal. In performing both the focus control and tilt control, the determination unit may change the first evaluation area according to the tilt adjustment result of the imaging plane by the tilt control unit.

The control apparatus may include an image analysis unit (control unit 101-6, image analysis unit 118) configured to analyze the image signal when at least one of the focusing result by the focus control unit and the tilt adjustment result of the imaging plane by the tilt control unit satisfies a predetermined condition. The control apparatus may include an analysis unit (control unit 101-6, image analysis unit 118) configured to analyze the image signal, and the tilt control unit may control the tilt in a period during which the analysis unit does not analyze the image signal.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-198145, filed on Oct. 22, 2018, which is hereby incorporated by reference herein in its entirety.

What is claimed is:

1. A control apparatus comprising:
   a focus control unit configured to perform a focus control which controls a focus lens;
   a tilt control unit configured to perform a tilt control which tilts an imaging plane of an image sensor relative to a plane orthogonal to an optical axis of an imaging optical system; and
   a determination unit configured to determine a first evaluation area for the focus control and a second evaluation area for the tilt control, the second evaluation area being different from the first evaluation area,
   wherein the determination unit determines a central area in a captured image as the first evaluation area, and a peripheral area in the captured image as the second evaluation area,
   wherein the focus control unit is configured to perform the focus control based on a contrast evaluation value in the first evaluation area,
   wherein the tilt control unit is configured to perform the tilt control based on a contrast evaluation value in the second evaluation area, and
   wherein at least one processor or circuit is configured to perform a function of at least one of the units.

2. The control apparatus according to claim 1, wherein each of the first evaluation area and the second evaluation area is made variable in performing both the focus control and the tilt control.

3. The control apparatus according to claim 1, wherein the focus control unit and the tilt control unit simultaneously perform the focus control and the tilt control.

4. The control apparatus according to claim 1, wherein the determination unit determines the first evaluation area by invalidating an arbitrary evaluation area used for the focus control previously determined in performing both the focus control and the tilt control.

5. The control apparatus according to claim 1, wherein the second evaluation area includes upper part and lower part of the captured image or left part and right part of the captured image.

6. The control apparatus according to claim 1, wherein in performing both the focus control and the tilt control, the determination unit changes the first evaluation area according to a tilt adjustment result of the imaging plane by the tilt control unit.

7. The control apparatus according to claim 1, further comprising:
   a control unit configured to determine whether the focus control unit has obtained a predetermined focusing result or the tilt control unit has obtained a predetermined tilt adjustment result; and
   an analysis unit configured to analyze the captured image when the control unit determines that the focus control unit has obtained the predetermined focusing result or the tilt control unit has obtained the predetermined tilt adjustment result.

8. The control apparatus according to claim 1, further comprising an analysis unit configured to analyze the captured image,
   wherein the tilt control unit performs the tilt control in a period in which the analysis unit does not analyze the captured image.

9. An imaging apparatus comprising:
   an image sensor configured to photoelectrically convert an optical image formed through an imaging optical system; and
   a control apparatus,
   wherein the control apparatus includes:
      a focus control unit configured to perform a focus control which controls a focus lens;
      a tilt control unit configured to perform a tilt control which tilts an imaging plane of an image sensor relative to a plane orthogonal to an optical axis of an imaging optical system; and
      a determination unit configured to determine a first evaluation area for the focus control and a second evaluation area for the tilt control, the second evaluation area being different from the first evaluation area, wherein the determination unit determines a central area in a captured image as the first evaluation area, and a peripheral area in the captured image as the second evaluation area, wherein the focus control unit is configured to perform the focus control based on a contrast evaluation value in the first evaluation area, and wherein the tilt control unit is configured to perform the tilt control based on a contrast evaluation value in the second evaluation area.

10. A control method comprising:

determining a first evaluation area for a focus control which controls a focus lens and a second evaluation area for a tilt control which tilts an imaging plane of an imaging sensor relative to a plane orthogonal to an optical axis of an imaging optical system, the second evaluation area being different from the first evaluation area; and performing both the focus control based on the first evaluation area of a captured image, and the tilt control based on the second evaluation area of the captured image, wherein a central area in a captured image is determined as the first evaluation area, and a peripheral area in the captured image is determined as the second evaluation area, wherein the focus control is performed based on a contrast evaluation value in the first evaluation area, and wherein the tilt control is performed based on a contrast evaluation value in the second evaluation area.

11. A non-transitory computer-readable storage medium storing a program for causing a computer to execute a control method, wherein the control method includes:

determining a first evaluation area for a focus control which controls a focus lens and a second evaluation area for a tilt control which tilts an imaging plane of an imaging sensor relative to a plane orthogonal to an optical axis of an imaging optical system, the second evaluation area being different from the first evaluation area; and performing both the focus control based on the first evaluation area of a captured image, and the tilt control based on the second evaluation area of the captured image, wherein a central area in a captured image is determined as the first evaluation area, and a peripheral area in the captured image is determined as the second evaluation area, wherein the focus control is performed based on a contrast evaluation value in the first evaluation area, and wherein the tilt control is performed based on a contrast evaluation value in the second evaluation area.

* * * * *